Patented Apr. 5, 1949

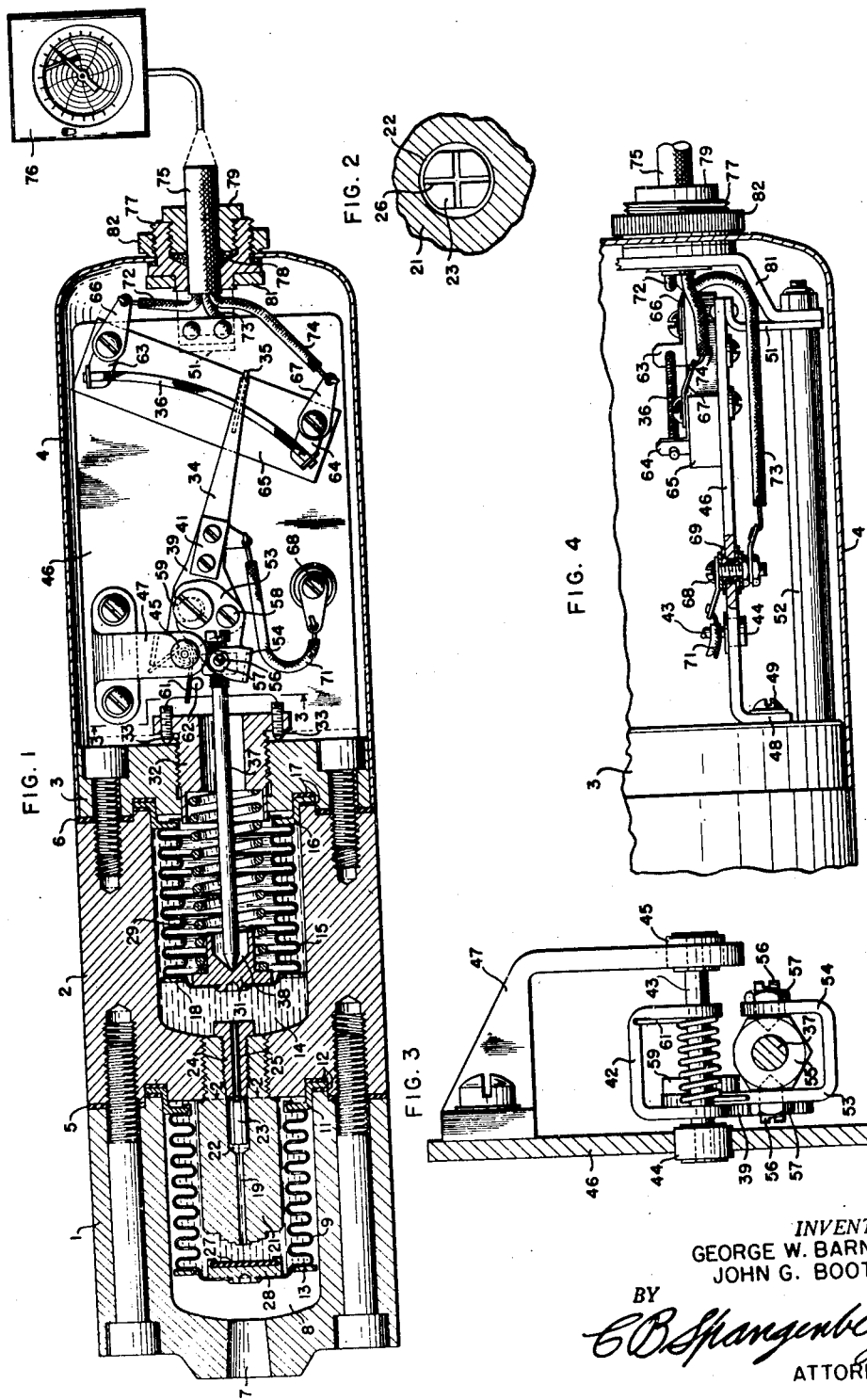

2,466,071

UNITED STATES PATENT OFFICE 2,466,071

PRESSURE MEASURING INSTRUMENT

George W. Barnes, Jr., Clifton Heights, and John G. Booth, Philadelphia, Pa., assignors, by mesne assignments, to Minneapolis-Honeywell Regulator Company, Minneapolis, Minn., a corporation of Delaware Application April 12, 1944, Serial No. 530,612

5 Claims. (Cl. 73—398)

The present invention relates to pressure measuring instruments and more particularly to a pressure measuring unit in which there is provided a means to measure a pressure and to translate this pressure into an electrical value. The electrical value is then transmitted to a suitable recording and/or control instrument.

It is often desired to measure the pressure of some fluids which will have a deleterious effect on the pressure measuring instrument either because of their chemical composition, or because of their high viscosity, or because of sudden and violent surges in the pressure of the fluid. When these pressure measurements are made it is frequently necessary to transmit them to some remote point where a record of their value can be made and where a control of the pressure may be initiated.

It is an object of this invention to provide a pressure measuring instrument which is capable of measuring accurately pressures within a definite range and capable of cutting off the source of pressure from the instrument when it reaches a dangerous value. It is also an object of the invention to provide a pressure measuring instrument which is provided with a means to damp out surges in the pressure so that the exhibiting or control means connected therewith will be operated more in response to average pressure changes than to the violent fluctuations thereof. The instrument is, however, capable of reproducing accurately all pressure changes that are of any appreciable duration and are within its range of calibration.

It is a further object of the invention to produce a pressure measuring instrument in which the pressure measuring elements are separated and protected from the fluid to be measured. Thus if the fluid whose pressure is to be measured is dirty, corrosive or too viscous to be used with ordinary pressure measuring instruments it may safely be used with the instrument disclosed herein since the sensitive parts thereof are protected from the action of said fluid.

It is a further object of the invention to provide a pressure measuring instrument which translates the variations of pressure into an electrical impulse which varies in accordance with the pressure changes. This electrical impulse is transmitted to a suitable instrument which may, for example, take the form of a conventional self-balancing potentiometer, or other suitable instrument capable of recording the value of the electrical impulse. This latter instrument may, if desired, also indicate the value and be used to control the pressure of the fluid under measurement.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

In the drawings:

Figure 1 is a sectional view of the pressure responsive unit,

Figure 2 is a view taken on lines 2—2 of Figure 1,

Figure 3 is a view taken on lines 3—3 of Figure 1, and

Figure 4 is a view showing the contact and slide-wire supporting means.

Referring first to Figure 1, there is shown in section the pressure responsive unit which is encased in a housing formed of three castings, 1, 2 and 3 and a cover member 4. The parts 1, 2 and 3 are strong enough to withstand any pressure to which the unit will be subjected and are bolted together by means of suitable bolts. The joints between the various parts are provided with gaskets 5 and 6, respectively, so that a pressure tight joint will be formed. The cover 4 is primarily used to protect various parts of the mechanism which extend beyond the end of the casting 3. The casting 1 has formed in its left end an opening 7 through which the pressure to be measured may be applied to a chamber 8 which is formed within this casting. One wall of the chamber consists of a bellows 9 that is mounted on a supporting ring 11 which is fastened between the castings 1 and 2. Each side of this member has gaskets 12 between it and the adjacent casting so that a pressure tight joint will be formed. The outer end of the bellows has an annular disc 13 fastened to it, which disc is slightly smaller in diameter than the interior of the chamber 8 and which disc acts as a guide to insure that the bellows will not flex laterally as it changes in length.

The inside of the bellows 9 forms one wall of a second chamber that is in communication with a third chamber 14 formed in the casting 2. The chamber 14 also has a flexible wall that is formed by means of a bellows 15. This bellows also has a ring 16 attached to its open end, which ring is received between gaskets 17 and between the castings 2 and 3 to form a pressure tight connection therewith. An annular disc 18 is also fastened to the end of the bellows 15 to prevent lateral movement of this bellows as it changes in length. The chamber 14 is in communication with the chamber formed by the interior of the bellows 9 by means of a bore 19 in a plug member 21 that is threaded into an opening in the end of the casting 2. This plug also acts as a stop to limit the contraction of the bellows 9. The bore 19 near its right end, is enlarged as shown at 22 and has a damping member 23 in it which member is held in place by a plug 24. The plug 24 is provided with an opening that is lined by a capillary tube 25 of suitable diameter. The damping member 23 is provided on its right end where it engages the end of the plug 24 with a pair of crossed, shallow grooves 26, as is shown best in Figure 2 of the drawing.

The chambers formed by the interior of the bellows 9 and the chamber 14, along with their communicating passage, are filled with a substantially incompressible liquid so that as the bellows 9 changes in length due to variations in the pressure applied thereto, the liquid will be forced from one of the chambers to the other to compress or permit elongation of the bellows 15 a corresponding amount. The construction of the parts located within the plug member 21 serve as a flow damping means so that excessive and violent changes in the pressure which is applied to the chamber 8 can only be transmitted at a given rate to the chamber 14. This prevents violent actuation of the pressure responsive elements. The size of the capillary tube 25 tends to limit the rate of the flow of fluid between the chambers and if there is a violent increase in pressure the damping member 23 will be forced up against the end of the plug 24 and a change can only take place in the chamber 14 at a rate depending upon how fast the fluid can flow through the grooves 26 to the tube 25. Such a construction permits the bellows 15 to be flexed in accordance with an average pressure value rather than being flexed in response to each surge of the pressure applied to the chamber 8. If the pressure change is of sufficient duration, however, its value will be indicated since liquid will flow past grooves 26 until the fluid pressure in the two chambers is equalized. It is noted that a pressure seal is provided to cut off the transmission of the pressure to the chamber 14 when the pressure applied to the chamber 8 exceeds some maximum value. This is done by means of a resilient seal 27 that is attached by means of a supporting member 28 to the interior of the end of bellows 9. This seal will act to close the left end of the bore 19 when some maximum pressure has been reached.

As the bellows 15 is compressed its acts against the force of a calibrated spring 29 in order to transmit its movement to an indicating, recording or controlling instrument. This spring bears with its left end against a seat member 31 that is attached to the inner end of the bellows 15. The right end of the spring bears against an adjustable seat 32 that is threaded into the casting 3. The seat 32 is rotated until the tension of the spring reaches some desired value. Thereafter set screws 33 are put through a flange of the adjusting member 32 and tightened against the end of the casting 3 to prevent rotation of the member 32 and consequent change in the adjustment of the calibrated spring.

Movement of the bellows 15 is transmitted to a contact arm 34, which has a contact 35 attached to it, that moves over a slidewire or resistance 36. This movement is transmitted to the contact arm by means of a bellows rod 37 which is received in a socket 38 formed in the member 31 and which is pivotally attached to the arm 34 in a manner to be described below.

The contact arm 34 is mounted upon a pivoted supporting arm 39 and is insulated therefrom by suitable insulating blocks 41. The left end of the arm 39 is bent into a U-shape as is shown at 42 in Figure 3. The arm 39 is mounted for pivotal movement on a shaft 43 that passes through the arms of the U and has on its rollers 44 and 45 which as a pivot supports for the shaft. The roller 44 is received in an opening in a supporting plate 46, while the roller 45 is received in one arm of a yoke member 47 that is attached to the plate 46, as shown in Figures 1 and 3. In order that the plate 46 may be mounted in a proper position adjacent the bellows rod 37 the end of the plate 46 is bent downwardly as shown at 48 in Figure 4 and is attached to the outside of the casting 3 by screws 49. Since the unit may be subjected to vibration the plate 46 is also supported at its outer end by a bracket 51 which is attached to a bolt 52 that is threaded into the end of the casting 3. Thus the plate 46 is supported at both ends and will remain rigid with respect to the casting to which it is attached.

The supporting arm 39 is moved by the bellows rod 37 through a second arm 53 that is fastened to the arm 39 and which arm 53 also has a U-shaped portion 54 on its left end. A connection between the bellows rod 37 and the arm 53 is formed by a bolt 55 through which rod 37 is threaded, and which bolt is pivotally mounted between the arms of the U 54. As best shown in Figure 3 of the drawing, the bolt member 55 has depressions formed in its side which receive pivot screws 56 that are threaded into the arms of the U. These screws are held in place by means of lock nuts 57. It is noted that the arm 53 is adjustably attached to the arm 39 by means of a pivot screw 58 which extends through both the arms 53 and 39, and by an eccentric stud 59 that is mounted in arm 39 and received by a slot in arm 53. Rotation of stud 59 will adjust part 53 relative to part 39 around screw 58 as an axis. The contact arm 34 and the parts which are connected thereto are biased in a clock-wise direction in Figure 1 by means of a spring 61 that encircles the shaft 43 and bears with one end against the yoke 42, and with its other end against a pin 62 which projects upwardly from the plate 46.

The resistance 36 over which the contact 35 moves is mounted on brackets 63 and 64 which are fastened in a suitable manner to an insulating block 65 that is in turn attached rigidly to the plate 46. Each of the supporting brackets 63 and 64 has a connector terminal 66 and 67, respectively, attached to it. A terminal 68 is mounted in the plate 46 and insulated therefrom by insulating members 69. This terminal is connected by means of a wire 71 to the contact arm 34. In order that the ends of the resistance and the contact 35 that may be connected in a suitable electric circuit, wires 72, 73 and 74 which form a three-wire cable 75 are attached to the contacts 66, 68 and 67 respectively. This cable extends to a suitable recording or controlling instrument shown at 76 which instrument is preferably of the potentiometer type which is shown in Wills application, Serial No.

421,173, filed on December 21, 1941, now Patent 2,423,540, issued July 8, 1947. An arrangement is shown in that application through which a slide-wire and a contact movable relative thereto can be connected in a bridge circuit and used to indicate or record the value of a variable and to control its value.

The cable 75 passes from the responsive unit through a guide 77 which is mounted upon a bracket 81 that is also attached to the bolt 52. In order that a tight joint may be made between the cable and the guide, suitable packing 78 is placed around the cable in a socket provided in the guide, and a nut 79 is used to force the packing into place. The cover member 4 is held in place on the casting 3 and is forced tightly against the gasket 6 by means of a nut 82 which engages the outside of this casting and which nut is received by the guide member 77.

From the above it will be seen that we have provided a pressure responsive unit in which the fluid whose pressure is to be measured does not come in contact with any of the sensitive measuring elements of the system. The bellows 9 can be made of some material which is capable of withstanding any corrosive action of the fluid to be measured and the opening 7 can be made of such size that even if the fluid being measured is very viscous its pressure fluctuations can be readily applied to the exterior of the bellows 9. Since a liquid is ordinarily used to transfer the movement of the bellows 9 to the bellows 15, the speed of flexing of the bellows 15 can be readily controlled by regulating the size of the opening in tube 25 and the size of the grooves 26 formed on the member 23. This is of a decided advantage in a case where the pressure is rapidly fluctuating and it is desired to record only the general trend of the pressure changes. The curve that is drawn by the recording instrument 76 would in such a case be in effect the average of the pressure changes. It should be noted, however, that any pressure changes of sufficient duration will be recorded since the passage between the two fluid filled chambers is never completely closed. It will also be seen that any pressure above a predetermined maximum will be shut off from the instrument and thereby be prevented from damaging the same. The transmission of the pressure changes through an electrical circuit is of an advantage in a great many places where it is not practical to have the indicating instrument closely adjacent the responsive unit and in cases where it is not practical to have an air line supplied to the responsive unit. The pressure unit per se may be readily manufactured and because of its fool-proof construction can be placed in inaccessible positions where it will continue to function with a minimum of attention.

While in accordance with the provisions of the statutes we have illustrated and described the best form of our invention now known to us, it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent is:

1. A pressure responsive unit including a generally cylindrical casting having a cavity formed in one end, a bellows extending into the end of said cavity and attached to the end of said casting, said bellows and cavity forming an expansible chamber, a calibrating spring bearing against the end of said bellows, means to hold said spring in position and adjust the same, a member attached to and projecting from the opposite end of said casting, a second bellows extending over said member and attached to said casting, said second bellows and member forming a second expansible chamber, said member and said casting being formed with a passage of small diameter extending between said two expansible chambers, a substantially incompressible liquid filling said expansible chambers and said passage, the latter serving to retard the flow of liquid from one chamber to the other, a substantially cup shaped member having an opening therein attached to said opposite end of said casting to enclose and protect said second bellows, means attached to the first mentioned end of said casting and operated by said first bellows as it changes in length, a protecting cap attached to said casting to cover and protect said last mentioned means, said cap having an opening therein, indicating means, and means extending through the opening in the cap connecting the means operated by said first bellows and the indicating means whereby the latter may be actuated.

2. In a pressure responsive unit the combination of a casing being formed with a pair of chambers therein, a first and a second bellows each forming one wall of one of said chambers, said casing being formed with a passage between said chambers, a substantially incompressible liquid filling said chambers and said passage whereby when a pressure is applied to said first bellows to deform the same said liquid will act to deform similarly said second bellows, said passage being of a diameter to retard the flow of liquid from one chamber to the other, a calibrating spring extending between said second bellows and said casing and operative to procure a predetermined deformation of said second bellows for a given pressure change applied to said first bellows, a support attached to said casing, a member pivoted to said support, a rod engaging the end of said second bellows and moved thereby, an adjustable connection between said rod and said pivoted member and electrical transmission means operated by said pivoted member as it moves in response to pressure changes applied to said first bellows.

3. A pressure responsive unit including a casing being formed with a pair of expansible chambers therein, a first and a second bellows each forming a wall of one of said chambers, said casing being formed with a restricted passage extending between said chambers, a substantially incompressible liquid filling said chambers and passage whereby as said first bellows is changed in length due to a change in pressure applied thereto the length of said second bellows will be changed accordingly, a calibrating spring interposed between a movable portion of one of said bellows and said casing and circled by said bellows so as to be housed thereby, a support attached to said casing adjacent said chamber having the second bellows as a wall thereof and projecting outwardly therefrom, a resistance mounted on said support, a contact, means to pivot said contact on said support in a position to move across said resistance, a rod engaging said second bellows and moved thereby as the latter changes in length, and an adjustable connection between said rod and said means to pivot said contact the arrangement being such that said contact will be moved across said resistance an amount proportional to the pressure applied to said first bellows.

4. A pressure responsive device comprising a casing, a first bellows cooperating with a portion of said casing to form a first chamber, a second bellows cooperating with another portion of said casing to form a second chamber, said casing being formed with a passage forming a restricted connection between said chambers, a substantially incompressible liquid filling said chambers and said passage whereby as said first bellows has its length changed by a pressure applied thereto said second bellows will be changed in length a corresponding amount, calibrated resilient means cooperating with said second bellows and operative to allow said second bellows to change in length a predetermined amount for a given pressure change applied to said first bellows, electrical transmission means, and an adjustable connection extending between said second bellows and said transmission means to operate the latter in response to a change in length of said second bellows.

5. A pressure responsive unit including a casing having a pair of expansible chambers and a passage connecting said chambers formed therein, each chamber having a deformable wall, a substantially incompressible liquid filling said chambers and passage so that when pressure is applied to deform one of said walls the other of said walls will be deformed a corresponding amount, a calibrating spring cooperating with one of said deformable walls and operative to allow said deformable wall to change in length a predetermined amount for a given pressure change applied to said first bellows, said spring being received in a cavity formed by said deformable wall with which said spring cooperates, a support attached to said casing adjacent to said other of said walls and extending perpendicularly to the direction to movement thereof as said wall is deformed, an elongated resistance element, a contact, means to mount pivotally said contact on said support and for movement along said resistance, a member pivoted to said mounting means, a rod adjustably secured to said member and extending into engagement with said other wall for movement thereby as the latter is deformed, and resilient means acting on said mounting means to bias normally said contact toward one end of said resistance and said rod into engagement with said other wall.

GEORGE W. BARNES, Jr.
JOHN G. BOOTH.

REFERENCES CITED

The following references are of record in the file of this patent:

UNITED STATES PATENTS

| Number | Name | Date |
|---|---|---|
| 324,251 | Hartwell | Aug. 11, 1885 |
| 643,876 | Lane | Feb. 20, 1900 |
| 774,815 | Anderson | Nov. 15, 1904 |
| 1,398,792 | Paulin | Nov. 29, 1921 |
| 1,836,682 | Ray | Dec. 15, 1931 |
| 2,065,702 | Hubbard | Dec. 29, 1936 |
| 2,140,954 | Frazee | Dec. 20, 1938 |
| 2,216,374 | Martin | Oct. 1, 1940 |
| 2,226,441 | Paul | Dec. 24, 1940 |
| 2,244,335 | Hopkins | June 3, 1941 |
| 2,297,678 | Allen | Oct. 6, 1942 |
| 2,297,679 | Allen | Oct. 6, 1942 |

FOREIGN PATENTS

| Number | Country | Date |
|---|---|---|
| 190,814 | Great Britain | Jan. 1, 1923 |
| 688,097 | Germany | Feb. 12, 1940 |

OTHER REFERENCES

Page 40, Feb. 1934, issue of Instruments. (A copy of this page may be found in Div. 36, U. S. Patent Office.)